UNITED STATES PATENT OFFICE.

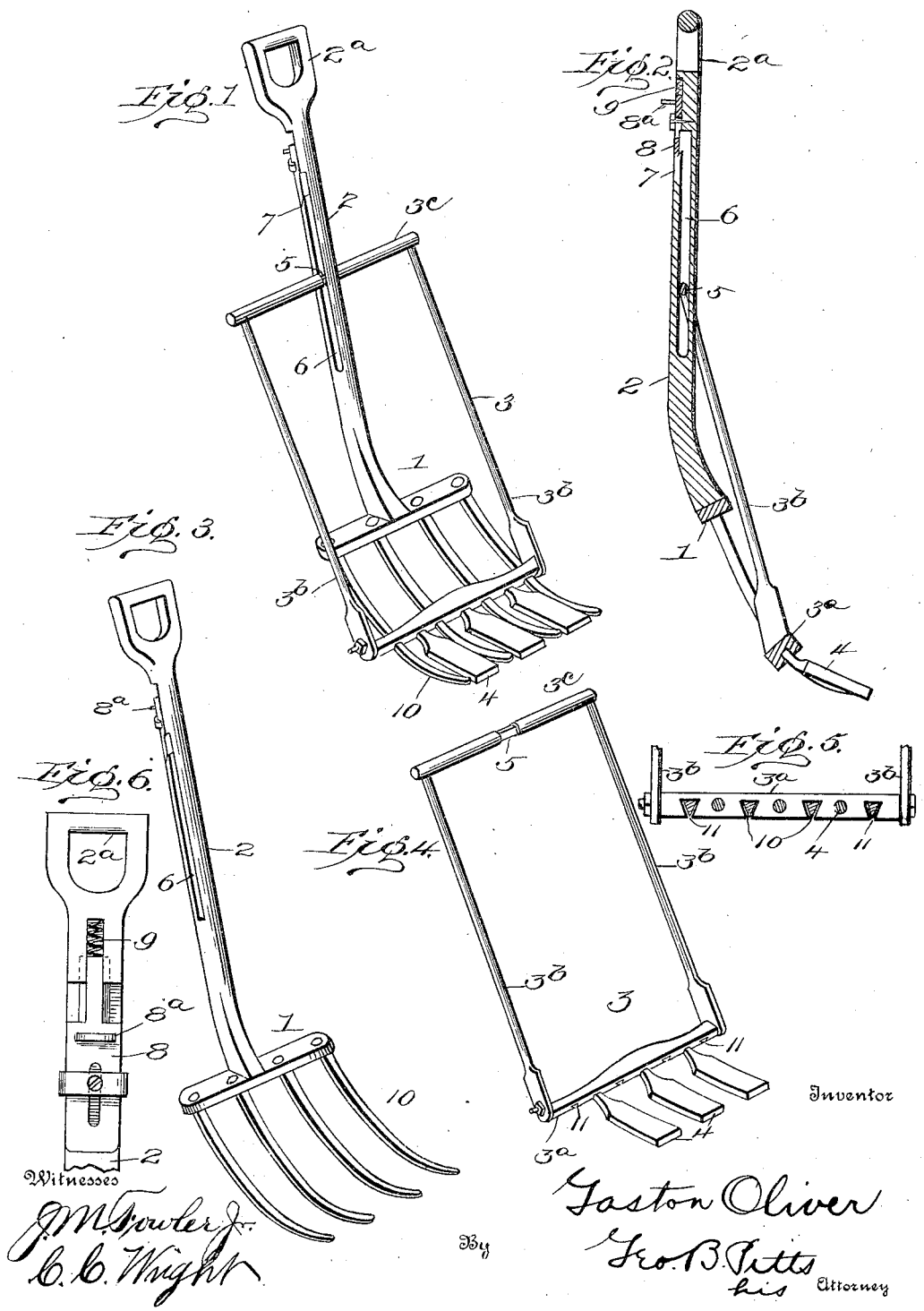

GASTON OLIVER, OF LYNCHBURG, VIRGINIA.

TAMPING-TOOL.

No. 887,218.  Specification of Letters Patent.  Patented May 12, 1908.

Application filed March 2, 1908. Serial No. 418,810.

*To all whom it may concern:*

Be it known that I, GASTON OLIVER, a citizen of the United States, residing at Lynchburg, in the county of Campbell and State of Virginia, have invented certain new and useful Improvements in Tamping-Tools, of which the following is a specification.

My invention relates to tamping tools.

It has for its object to produce a tool of novel form adapted to ram or tamp material.

Another object of the invention is to combine with a shoveling device or tool, reciprocating tamping devices for ram packing material in a convenient manner.

Referring to the accompanying drawing:

Figure 1 is a perspective view of a tamping tool, embodying my invention. Fig. 2 is a longitudinal section through the tool. Figs. 3 and 4 are perspective views of the shoveling device and reciprocating frame, separated, respectively. Fig. 5 is a transverse section through the teeth of the shoveling device and tampers, showing the tamper-carrying bar in elevation. Fig. 6 is is a detail view.

In the drawings, 1 indicates the shoveling device adapted to throw or shovel the material to be rammed into position. This device may be of any suitable or desired type. In the preferred form, it comprises a fork. Attached to the shoveling device in the usual manner is a handle 2 provided with the usual grasping loop $2^a$ at its outer end.

3 indicates a reciprocating frame consisting of a bar $3^a$, a pair of links $3^b$ pivotally connected at one end to the opposite ends of the bar $3^a$, and a handle bar $3^c$ connecting the opposite ends of the links together.

4 indicates a series of tamping devices secured to the bar $3^a$. The tampers may be of any desired shape and be secured in any suitable manner to or made integral with the said bar. They are preferably secured to the bar $3^a$ so that they lie between the fork teeth and approximately in a plane therewith.

In order that the frame 3 may be guided in its movements, I provide the bar $3^a$ with apertures near its opposite ends to receive the outer most tooth on each side of the fork and be guided thereby. I prefer to provide the bar with as many apertures as there are teeth in the fork so that each tooth forms a guide.

The apertures in the bar $3^a$ are preferably of triangular shape and the teeth 10 of the fork are correspondingly shaped. The teeth are arranged so that two of their longitudinal sides are inclined downwardly and toward each other and engage with the correspondingly arranged walls of the apertures.

11 indicates slots or openings formed in the lower edge of the bar $3^a$ and communicating with the apertures therein. The advantages of this construction are that the lower inclined sides of the teeth operate to force any dirt that may lodge in the apertures downwardly and out through the openings 11. In this manner all clogging between the bar $3^a$ and teeth 10 is prevented.

The means for guiding the handle bar $3^c$ comprises an elongated slot or opening 6, cut in the handle of the shoveling device, adapted to receive a reduced portion 5 formed in the handle bar between its ends. This construction permits the handle bar to be guided in its movements and also prevents any binding between the tamper carrying bar $3^a$ and its guides.

When it is desired to use the shoveling device without the tampers, the entire reciprocating frame and tampers may be separated therefrom. To permit this separation, the handle 2 is provided with an opening 7 communicating with the slot 6, through which opening the reduced portion 5 of the handle bar $3^c$ is passed, after which the tamper carrying bar may readily slide off the free ends of the fork teeth and the entire frame thus detached.

The opening 7 is normally closed by a sliding latch 8, held in such position by a spring 9. The opening may be arranged at any suitable place on the handle.

In using my tool, the material is first shoveled into the place where it is to be ram packed. The device is then placed in position so that the tampers may operate on the material with the teeth or free end of the device engaging the ground, it being held in rigid position by one hand of the operator grasping the loop $2^a$ of the handle and one foot placed against the back or rear edge of the shoveling device. With the other hand the operator catches hold of the handle bar $3^c$ and moves the frame back and forth. By such operation the tampers are caused to reciprocate, thus packing the material tightly and efficiently. The operation may continue as long as it is desired and the tool shifted from one position to another as the operator finds necessary to properly tamp the material.

What I claim is:

1. In a tamping tool, the combination of a shoveling device, a reciprocating frame mounted thereon, and a tamper secured to the said reciprocating frame, substantially as set forth.

2. In a tamping tool, the combination of a shoveling device, a bar carried thereby, a tamper carried by the said bar, and means for reciprocating the bar to operate the tamper, substantially as set forth.

3. In a tamping tool, the combination of a shoveling device and a handle secured thereto, a reciprocating bar guided by the shoveling device, a handle bar, links connecting the said handle bar and reciprocating bar, and a series of tampers secured to the said reciprocating bar, substantially as set forth.

4. In a tamping tool, the combination of a shoveling device, a handle, provided with an elongated slot, secured to the shoveling device, a reciprocating bar guided by the said shoveling device, a handle bar movable in the slot of the handle, for operating the said reciprocating bar, links connecting the handle bar and reciprocating bar, and tampers secured to the latter bar and movable therewith, substantially as set forth.

5. In a tamping tool, the combination of a shoveling device provided with a handle, a reciprocating frame guided by the said shoveling device and handle, tampers carried by the said frame adapted to tamp material, and means for detaching the reciprocating frame and tampers from the shoveling device, substantially as set forth.

6. In a tamping tool, the combination of a shoveling device comprising a fork, a handle secured thereto, a reciprocating bar provided with apertures to receive the teeth of the fork and be guided thereby, tampers secured to the said bar, and means for operating the bar and tampers.

7. In a tamping tool, the combination of a shoveling device comprising a fork, a handle secured thereto, a reciprocating bar provided with apertures to receive the teeth of the fork and be guided thereby, tampers secured to the said bar between the fork teeth, and means for moving the bar and tampers back and forth.

8. In a tamping tool, the combination of a shoveling device, a handle provided with a slot secured thereto, a reciprocating frame comprising a bar $3^a$ movable relative to the said shoveling device, links pivotally connected to the said bar and a handle bar connecting the links together, the said handle bar being provided with a reduced portion to slide in the slot of the shoveling device handle, and tampers carried by the bar $3^a$, substantially as set forth.

9. In a tamping tool, the combination of a shoveling device comprising a fork, the teeth of the said fork having their lower longitudinal sides inclined downwardly and toward each other, a reciprocating bar provided with apertures to receive the fork teeth and having openings communicating with the said apertures, and tampers carried by the said bar, substantially as set forth.

GASTON $\overset{\text{his}}{\times}$ OLIVER.
mark

Witnesses:
J. R. MILLER,
K. OTEY, Jr.